(12) United States Patent
Skwara

(10) Patent No.: US 7,389,695 B2
(45) Date of Patent: Jun. 24, 2008

(54) WIRELESS FLUID PRESSURE SENSOR

(75) Inventor: Thomas A. Skwara, Orchard Park, NY (US)

(73) Assignee: Electrochem Solutions, Inc., Clarence, NY (US)

( * ) Notice: Subject to any disclaimer, the term of this patent is extended or adjusted under 35 U.S.C. 154(b) by 37 days.

(21) Appl. No.: 11/381,420

(22) Filed: May 3, 2006

(65) Prior Publication Data
US 2007/0157734 A1 Jul. 12, 2007

Related U.S. Application Data

(63) Continuation-in-part of application No. PCT/US2006/000570, filed on Jan. 9, 2006.

(60) Provisional application No. 60/642,365, filed on Jan. 7, 2005.

(51) Int. Cl.
*G01L 19/04* (2006.01)

(52) U.S. Cl. ........................................ 73/708

(58) Field of Classification Search ........... 73/700–756; 361/283.1–283.4
See application file for complete search history.

(56) References Cited

U.S. PATENT DOCUMENTS

| | | | |
|---|---|---|---|
| 2,194,624 A | 3/1940 | Titterington, Jr. | |
| 6,688,179 B2 * | 2/2004 | Potter et al. | 73/700 |
| 6,772,788 B1 | 8/2004 | Klein | |
| 6,840,110 B2 | 1/2005 | Mallison et al. | |

OTHER PUBLICATIONS

International Searching Authority, International Search Report and Writen Opinion of the International Searching Authority for PCT/US06/00570, dated Nov. 13, 2006.

* cited by examiner

*Primary Examiner*—Andre J. Allen
*Assistant Examiner*—Jermaine Jenkins
(74) *Attorney, Agent, or Firm*—Jaeckle Fleischmann & Mugel, LLP

(57) ABSTRACT

A battery powered wireless fluid pressure sensor has a sealed chamber which can be vented to the outside atmosphere through a re-sealable reference port to allow a user to set the reference atmosphere inside the pressure sensor enabling the pressure sensor to provide absolute, gauge and true gauge pressure readings. The sensor calculates and transmits the fluid pressure taking into account the temperature of the pressure transducer, the temperature of the electronic devices and the barometric pressure inside the sealed chamber to provide accurate pressure measurements over a wide range of operating conditions.

11 Claims, 5 Drawing Sheets

WIRELESS FLUID PRESSURE SENSOR

CROSS REFERENCE TO RELATED APPLICATIONS

This application is a continuation-in-part of International Application PCT/US2006/00570, with an international filing date of Jan. 9, 2006.

This application claims the benefit of U.S. Provisional Application No. 60/642,365 filed on Jan. 7, 2005, which is hereby incorporated by reference.

TECHNICAL FIELD

The present invention relates to fluid pressure sensors (for both liquids and gases), and, more particularly, to wireless fluid pressure sensors.

BACKGROUND OF THE INVENTION

Accuracy, versatility, ease of use, durability, and cost of manufacturing are important parameters for fluid pressure sensors. In the past hermetically sealed sensors have been used to provide a reference atmosphere for the pressure transducer (the pressure transducer providing an output indicative of a pressure differential on two surfaces of the transducer). A hermetic seal requires a container that is rigid and sealed well enough to withstand the normal wear and tear of a component which may be used in relatively instrument unfriendly industrial environments such as in chemical refineries and oil wells.

Such hermetically sealed pressure sensors provide a pressure measurement that is with respect to the environment inside the sensor package when the sensor was sealed. Sealing the sensor package in a vacuum increases the cost of manufacturing the sensor, while sealing the package at the factory ambient pressure prevents the accuracy of any direct absolute pressure measurement since moving the sensor to a different altitude will cause a pressure differential between the reference pressure of the sensor and the ambient air pressure. Either reference environment does not allow simple, direct measurement of both absolute and gauge pressure.

The use of a wireless pressure sensor allows easy relocation of the sensors and the easy addition of additional sensors as compared to more conventional wired pressure sensors.

What is needed is a fluid pressure sensor that is of high accuracy in an industrial operation while also being versatile, easy to set up and use, durable, and cost effective to manufacture.

It is a principal object of the present invention to a fluid pressure sensor that provides these needed parameters.

SUMMARY OF THE INVENTION

Briefly described, a fluid pressure sensor has a pressure transducer and a closable passage between the air outside of said pressure sensor for the pressure transducer and the reference atmosphere inside said pressure sensor.

Also described is a method of improving the performance of a pressure sensor by opening a fluid passageway between the interior of a housing of the pressure sensor and the outside of said housing and closing the passageway prior to measuring a fluid pressure.

In a further aspect of the invention the pressure is transmitted using IEEE standard 802.15.4 with a ZigBee type of data structure.

BRIEF DESCRIPTION OF THE DRAWINGS

The accompanying drawings, which are incorporated into and form a part of the specification, illustrate several embodiments of the present invention and together with the description, serve to explain the principles of the invention. The drawings are only for the purpose of illustrating a preferred embodiment of the invention and are not to be construed as limiting the invention. In the drawings.

Figure 1:
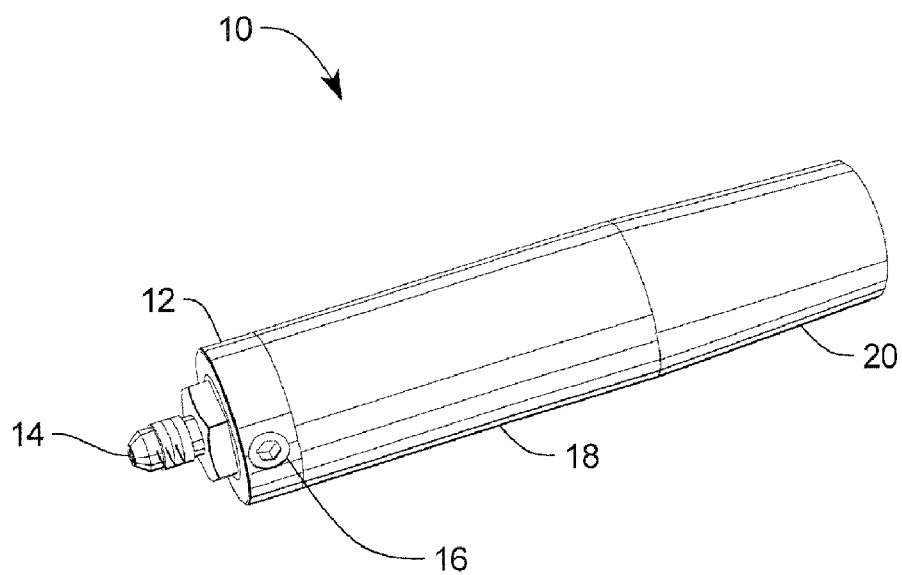
FIG. 1 is a perspective view of a fluid pressure sensor in accordance with the present invention.

It will be appreciated that for purposes of clarity and where deemed appropriate, reference numerals have been repeated in the figures to indicate corresponding features, and that the various elements in the drawings have not necessarily been drawn to scale in order to better show the features of the invention.

DESCRIPTION OF THE PREFERRED EMBODIMENTS

Turning now to the drawings FIG. 1 shows a perspective view of a wireless pressure sensor 10 in accordance with one embodiment of the present invention. The sensor 10 has a pressure cap 12 with a pressure port 14 for receiving a fluid, a pressure equalizing or reference port 16 in the pressure cap 12, a sleeve-like enclosure or body 18, and an antenna 20.

Figure 2:
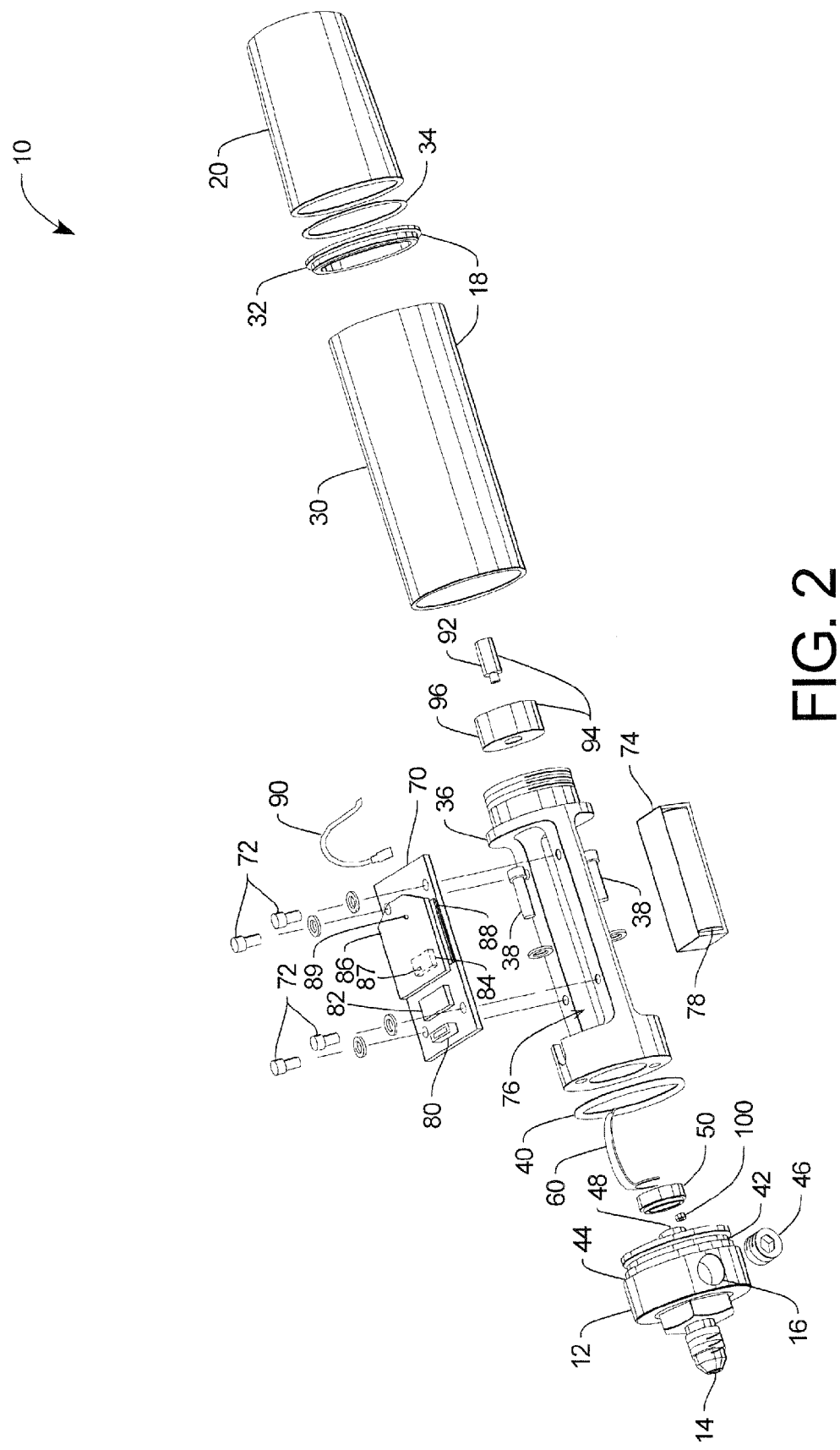
FIG. 2 is an exploded view of the pressure sensor shown in FIG. 1.

FIG. 2 is an exploded view of the sensor 10 showing various components of the sensor 10. The body 18 is manufactured from two parts, a case 30 and an end cap 32 which is press fit into the case 30 to provide a flat surface for an O-ring 34 located between the body 18 and the antenna 20. Female threads in the antenna 20, manufactured by Antennex of Glaendale Heights, Ill., mate with male threads formed on a high tension aluminum frame 36. The high tension aluminum frame 36 provides a rigid structure for the pressure gauge 10. The frame 36 is fastened to the pressure cap 12 by screws 38. A second O-ring 40 fits into a groove 42 in the pressure cap 12, and the body 18 fits over the frame 36 and onto a lip 44 in the pressure cap 12. The O-ring 40 forms an airtight and moisture tight seal between the body 18 and the pressure cap 12. When the antenna is screwed onto the frame 36, the O-ring 34 also forms an airtight and moisture tight seal between the antenna 20 and the body 18 such that the interior of the body 18 is sealed from the outside atmosphere when a reference port screw 46 is screwed into the reference port 16.

The pressure port 14 connects to the other end of the pressure cap 12 at an opening 48. The pressure inlet side of a pressure sensing element 50, a model number P571 manufactured by Strain Measurement Devices of Meriden, Conn., is electron-beam welded to the opening 48. The opposite side of the pressure sensing element 50 has a sputtered metal strain gauge formed on the pressure sensing element 50 in the form of a Wheatstone bridge thereby providing four electrical contacts to the strain gauge.

Figure 3:
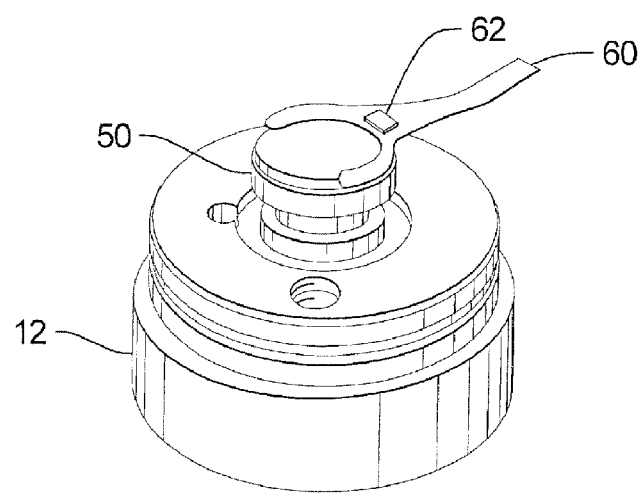
FIG. 3 is a perspective view of the wired pressure transducer with the temperature detection device in the pressure sensor shown in FIG. 1.

As shown in FIG. 3 a flexible wire harness 60 is attached to these four electrical contacts. A temperature measuring device 62 is mounted on the wire harness 60 in close proximity to the pressure sensing element 50 and connections to the temperature measuring device 62 are included in the wire harness 60. In the preferred embodiment the temperature measuring device 62 is a model PCS 1.1302.1 platinum RTD temperature sensor manufactured by Jumo Process Control, Inc. of Canastota, N.Y.

Returning to FIG. 2, an electronics board 70 is attached to the frame 36 by four bolts 72, and a battery holder 74 is attached to the back of the electronics board 70 so that it projects through an opening 76 in the frame 36. A battery 78, which in the preferred embodiment is a lithium thionyl chloride battery, is mounted in the battery holder 74. Other battery chemistries, such as lithium manganese, can also be used. The electronics board has four major components, a Zero Insertion Force (ZIF) connector 80 which receives one end of the flexible wire harness 60, a barometric pressure sensor 82 for measuring the absolute pressure inside the pressure sensor 10, a microcontroller 84 for controlling the operation of the pressure sensor 10, and a ZigBee/IEEE 802.15.4 RF data modem 86. The microcontroller 84 has an internal temperature sensor 87. The RF data modem 86 is mounted onto sockets 88, and the microcontroller 84 is located under the RF data modem 86. The RF data modem 86, which in the preferred embodiment is either a XBee or a XBee-Pro RF Module manufactured by MaxStream of Lindon, Utah, has an RF connector 89 attached to a coaxial cable 90 to connect the RF data modem 86 to a connecting conductor 92 held in a connecting insulator 96 of an RF feedthru system 94 which provides consistent characteristic impedance required for effective coupling of the RF data modem 86 to the antenna 20.

Figure 4:
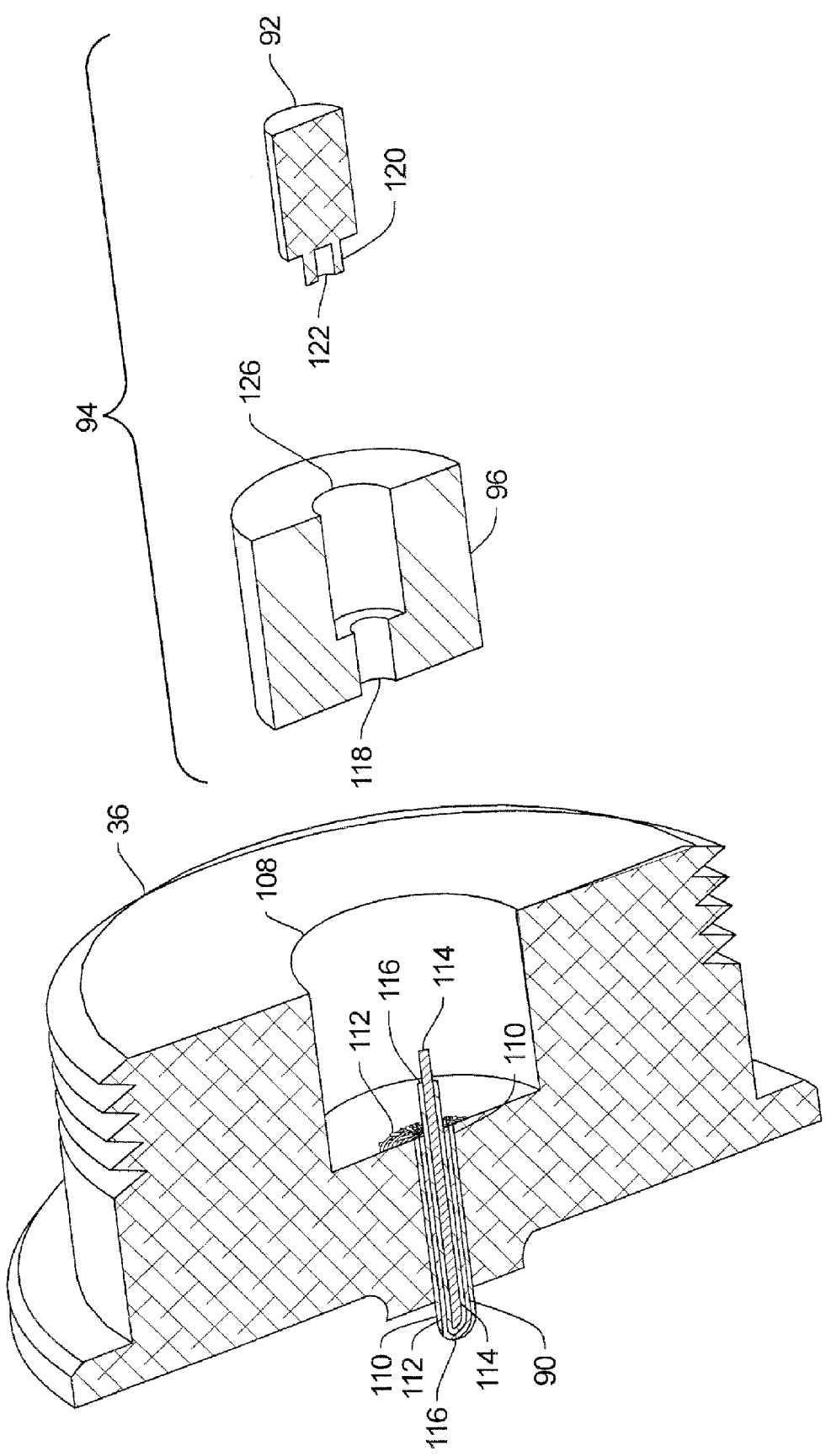
FIG. 4 is a sectional view of a portion of the fluid pressure sensor shown in FIG. 1.

FIG. 4 is a sectional view of the feedthru system 94. The coaxial cable 90 has an outer insulator 110, a braided shield 112, an inner conductor 114, and an inner insulator 116 between the shield 112 and the inner conductor 114. The coaxial cable 90 passes through the frame 36 into a cavity 108 formed in the top of the frame 36. The outer insulator 110 extends to the bottom of the cavity 108, and the braided shield 112 is flattened onto the bottom of the cavity 108. The inner insulator 116 is trimmed back a short distance from the end of the inner conductor 114. The connecting insulator 96 of the feedthru system 94 is placed in the cavity 108. The inner conductor insulator 116 and the inner conductor 114 pass through an opening 118 in the bottom of the connecting insulator 96, and the bottom of the connecting insulator 96 presses the braided shield 112 against the bottom of the cavity 108. A pipe structure 120 formed at the bottom of the connecting conductor 92 fits into the opening 118 and the inner conductor 114 is pressed into an opening 122 of the pipe structure 120. The rest of the connecting conductor 92 sits in an opening 126 of the connecting insulator 96 and projects beyond the top of the connecting insulator 96 to make contact with the inner connector on the antenna 20.

As shown in FIG. 2, a 20 micron filter 100 is inserted in the passageway between the reference port 16 and the interior of the pressure sensor 10 to prevent dirt and other debris from entering the pressure sensor 10.

Figure 5:
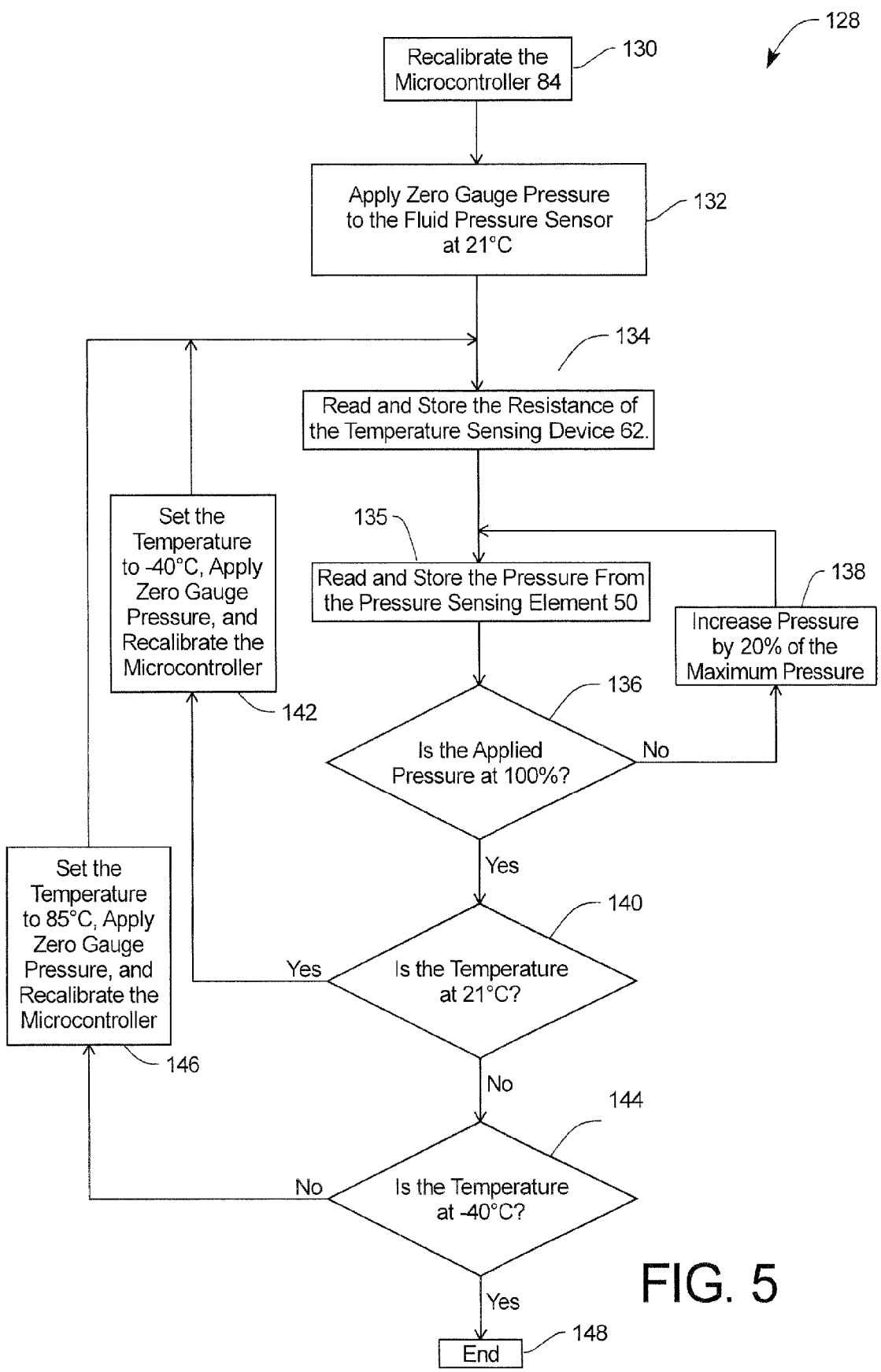
FIG. 5 is a flow diagram for the calibration procedure of the fluid pressure sensor shown in FIG. 1.

FIG. 5 is a flow diagram 128 for the calibration procedure of the fluid pressure sensor 10. The microcontroller 84 is first recalibrated by issuing a recalibration command to the microcontroller 84 as indicated by box 130. Then the fluid pressure gauge 10 has zero gauge pressure applied to it at 21° C. (ambient temperature) as indicated by box 132. The resistance of the temperature sensing device 62 is stored as indicated by box 134. The pressure data from the pressure sensing element 50 is then read and stored as indicated by box 135. The pressure applied to the pressure port 14 is then incremented by steps of 20% of the maximum pressure of the fluid pressure sensor 10, and the data from the pressure sensing element 50 is read and stored until 100% of the maximum pressure applied to the pressure port 14 has been reached as indicated by boxes 136 and 138. The temperature is changed to −40° C. as indicated by boxes 140 and 142, and the above operations indicated by boxes 134 and 135 are repeated. The temperature is then changed to 85° C. as indicated by boxes 140, 144, and 146, and the above operations indicated by boxes 134 and 135 are repeated. After the high temperature calibration process is completed, the calibration process ends as indicated by box 148.

Figure 6:
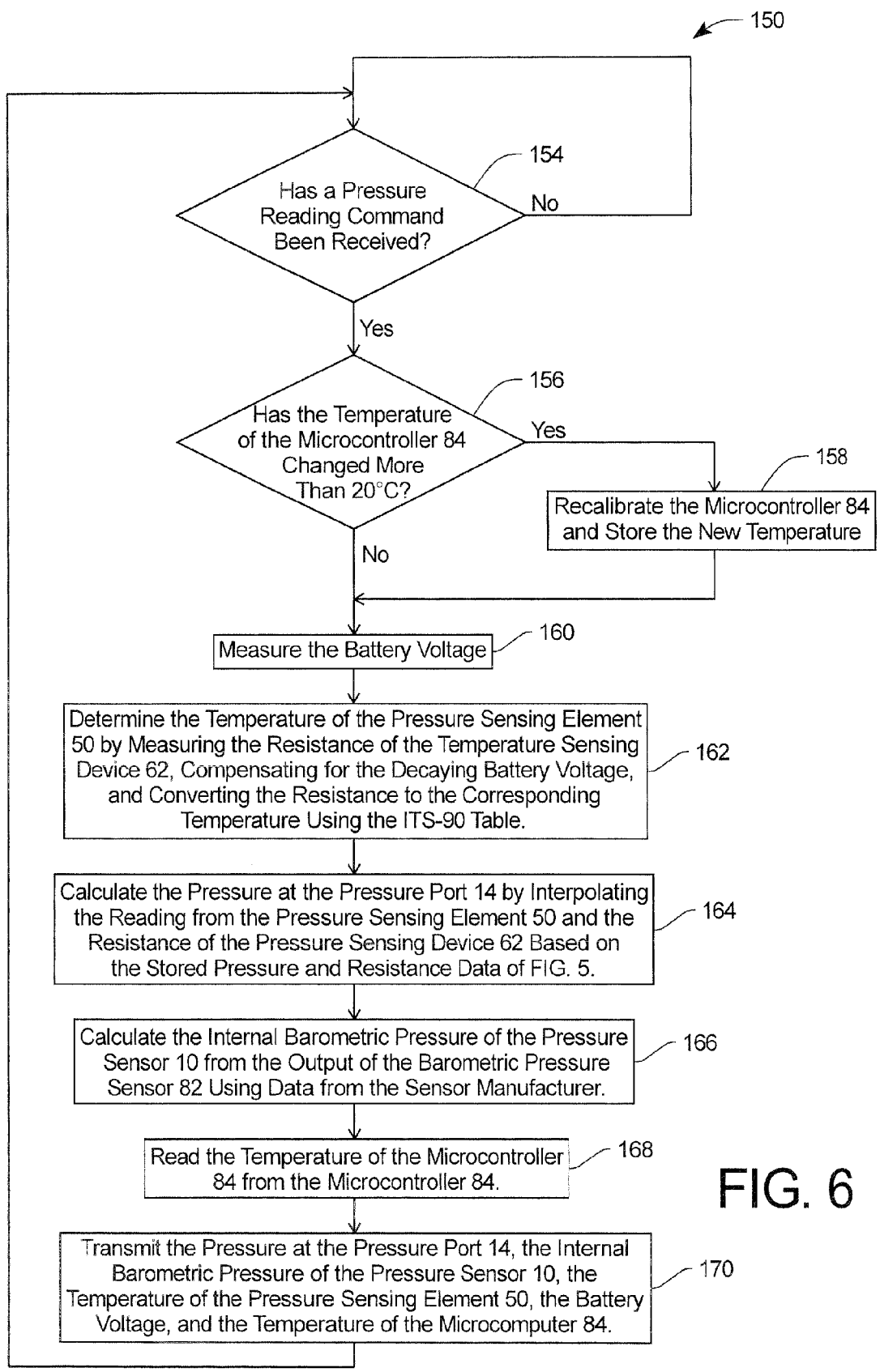
FIG. 6 is a flow diagram of the operation of the fluid pressure sensor shown in FIG. 1 in a customer application.

FIG. 6 is a flow diagram 150 of the operation of the fluid pressure sensor 10 in a customer application. The fluid pressure sensor 10 waits for a command for a pressure reading as indicated by box 154. When a command for a pressure sensor reading is received, the microcontroller 84 then reads the temperature of the temperature sensor 87 to determine if the temperature of the microcontroller 84 has changed more than 20° C. since the microcontroller 84 was last calibrated as indicated by box 156. If the temperature has changed more than 20° C., the microcontroller 84 is recalibrated by issuing a recalibration command to the microcontroller 84 as indicated by box 158. Then the voltage of the battery 78 is measured by the microcontroller 84 as indicated by box 160. The temperature of the pressure sensing element 50 is determined using electrical measurements from the temperature sensing device 62 which are then normalized using the measured battery voltage to compensate for decaying battery voltage and converted to a corresponding temperature using the ITS-90 table as indicated by box 162. The pressure at the pressure port 14 is calculated as indicated by box 164 by interpolating the reading from the pressure sensing element 50 and the resistance of the temperature sensing device 62 based on the stored pressure and the resistance of the temperature sensing device 62 generated in the calibration process described above with respect to FIG. 5. The internal barometric pressure of the pressure sensor 10 is calculated as indicated in box 166 from the output of the barometric pressure sensor 82 using data from the sensor manufacturer. The temperature of the microcontroller 84 is read using the microcontroller 84 as indicated by box 168. Finally, the pressure at the pressure port 14, the internal barometric pressure of the pressure sensor 10, the temperature of the pressure sensing element 50, the battery voltage, and the temperature of the microcontroller 84 are transmitted to a base station as indicated by box 170. The fluid pressure sensor 10 returns to the state of waiting for another pressure reading command as indicated in box 154.

The sending of the internal barometric pressure of the pressure sensor 10 along with the pressure at the pressure port 14 allows the user to determine the gauge pressure, the absolute pressure, and the true gauge pressure. The temperature of the temperature sensing device 62 provides an indication of the temperature of the fluid at the pressure port 14, while the temperature of the microcontroller 84 provides the temperature of the interior of the pressure sensor 10. The battery voltage provides an indication of the remaining effective life of the battery 78.

In a customer application, the microcontroller 84 puts itself and the RF data modem 86 into a sleep mode for 10 second intervals in the preferred embodiment, although the sleep time can be changed by the customer at any time. At the end of the 10 seconds, the RF data modem 86 interrogates a base station located remote from the pressure sensor 10 for any requests or instructions for the pressure sensor 10. If no data is to be transmitted and no action is to be performed by the pressure sensor 10, the RF data modem 86 goes into the sleep mode for another sleep interval. If pressure data is requested from the pressure sensor, the RF data modem 86 wakes up the microcontroller 84 and the microcontroller 84 calculates the pressure of the fluid at the pressure port 14 and sends the data to the RF data modem 86 which transmits the data to the base station using the procedure described above with respect to FIG. 6. Depending upon the instructions received by the RF data modem from the remote base station, the microcontroller 84 may perform other tasks such as configuration changes. Subsequent to any activity, both the RF data modem 86 and microcontroller 84 return to a sleep mode until the next wake-up event.

The reference port 16 can be opened by the customer at the site where the pressure sensor is to be used and the pressure sensor 10 can then provide absolute pressure, gauge pressure, or true gauge pressure which cannot be provided accurately by hermetically sealed pressure sensors.

The non-hermetically sealed pressure sensor of the preferred embodiment of the invention is less expensive to manufacture since a hermetic seal which will remain hermetic during normal use in industry requires specialized packaging materials and production steps that are not required by a non-hermetic sealed pressure sensor. The compensation of the pressure reading from the pressure sensing element 50 based on the temperature of the pressure sensing element 50, the internal pressure inside the pressure sensor 50, and the temperature of the electronic components provides greater accuracy in the pressure measurement than without taking into account these additional factors. The pressure sensor 10 is easy to use since only a wireless connection is needed to use the pressure sensor 10. The compensation of the pressure sensing element 50 data by the effects of the temperature of the pressure sensing element 50, the pressure inside the pressure sensor 50 and the temperature of the electronics is invisible to the user. The duration of the guaranteed accuracy of the pressure sensor 10, and the life of the battery is one year in the preferred embodiment using the XBee RF module. This RF module has a data transmission range of about 100 feet indoors. If a greater range is required, the XBee-Pro can be used to provide about 300 feet of transmission indoors, but at a corresponding greater use of battery power during non-sleep operation of the RF data modem 86. The use of the sockets 88 allows easy mounting of the type of RF data modem 86 needed by the customer.

During construction of the pressure sensor 10 one of several types of pressure transducers 50 are selected depending on the maximum pressure which will be applied to the pressure sensor 10 as specified by the customer.

Other embodiments according to the present invention include embodiments with an LCD display for visual reading of the pressure, the use of a larger battery to provide longer unattended service for the pressure sensor 10, and modifying the preferred embodiment of the pressure sensor 10 to measure only the temperature of the fluid.

The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A pressure sensor including:
  a pressure sensing element;
  a closable passage between the air outside of said pressure sensor for said pressure sensing element and a reference atmosphere inside said pressure sensor;
  an RF data modem to provide wireless data transmission;
  a microcontroller coupled to said RF data modem and to said pressure sensing element; and
  a barometric pressure sensor inside said reference atmosphere coupled to said microcontroller for detecting the pressure of said reference atmosphere.

2. The pressure sensor set forth in claim 1 wherein said pressure sensor further comprises:
  a) a first temperature sensor coupled to said microcontroller and positioned in close thermal proximity to said pressure sensing element for measuring the temperature of said pressure sensing element; and
  b) a second temperature sensor contained within said microcontroller.

3. A pressure sensor comprising:
  a) a housing containing a pressure sensing element and defining a sealed chamber;
  b) a pressure sensing opening in said housing coupled to a first portion of said pressure sensing element, said first portion separated from an inside of said housing such that any differential fluid pressure between a pressure sensing port and the inside of the housing is maintained; and
  c) a closeable fluid passage from an outside of the housing and the inside of the housing;
  d) an RF data modem to provide wireless data transmission;
  e) a microcontroller coupled to said RF data modem; and
  f) a barometric pressure sensor inside said sealed chamber coupled to said microcontroller for detecting the pressure of said reference atmosphere.

4. The pressure sensor set forth in claim 3 wherein said pressure sensor further comprises:
  a) a first temperature sensor coupled to said microcontroller and positioned in close thermal proximity to said pressure sensing element for measuring the temperature of said pressure sensing element; and
  b) a second temperature sensor contained within said microcontroller.

5. A method of improving the performance of a pressure sensor comprising the steps of:
  a) opening a fluid passageway between an interior of a housing of said pressure sensor and an outside of said housing;
  b) closing said fluid passageway prior to measuring a fluid pressure; and
  c) transmitting pressure data from said pressure sensor from an RF data modem coupled to a microcontroller which receives data from a pressure sensing element in said pressure sensor and from a barometric pressure sensor inside said housing of said pressure sensor, wherein said barometric pressure sensor detects the pressure inside said housing of said pressure sensor.

6. The method set forth in claim 5 further including the steps of measuring the temperature of said pressure sensing element and measuring the temperature of said microcontroller.

7. The method set forth in claim 6 further including steps of calibrating said pressure sensor to produce calibrated data and using said calibrated data to calculate the fluid pressure applied to said pressure sensor.

8. The method set forth in claim 7 wherein said calibration and calculation uses data from a pressure sensing element and a temperature sensing element which is substantially at the same temperature as said pressure sensing element.

9. A method for providing information about a fluid comprising the steps of:
   a) measuring a pressure differential between said fluid and an interior of a pressure sensor using a pressure sensing element having a strain gauge attached thereto;
   b) measure the voltage of a battery in said pressure sensor;
   c) determining the temperature of said pressure sensing element using said battery while taking into account said measured battery voltage;
   d) determining an internal pressure of said pressure sensor;
   e) determining the temperature of said interior of said pressure sensor;
   f) determining the pressure of said fluid by interpolating the output of said strain gauge and the temperature of said pressure sensing element based on the stored outputs of said strain gauge for discrete fluid pressures and temperatures; and
   g) transmitting said pressure of said fluid, said internal temperature of said pressure sensor, said internal pressure of said pressure sensor, said battery voltage, and said internal temperature of said pressure sensor.

10. The method set forth in claim 9 wherein said step of transmitting conforms to IEEE standard 802.15.4.

11. A pressure sensor including:
    a pressure sensing element;
    a closable passage between the air outside of said pressure sensor for said pressure sensing element and a reference atmosphere inside said pressure sensor;
    a wireless communication device to provide wireless data transmission;
    a microcontroller coupled to said wireless communication device and to said pressure sensing element; and
    a barometric pressure sensor inside said reference atmosphere coupled to said microcontroller for detecting the pressure of said reference atmosphere.

* * * * *